(12) United States Patent
Peled et al.

(10) Patent No.: US 6,811,911 B1
(45) Date of Patent: Nov. 2, 2004

(54) ION CONDUCTIVE MATRIXES AND THEIR USE

(75) Inventors: Emanuel Peled, Even Yehuda (IL); Tair Duvdevani, Ramat Gan (IL); Avi Melman, Holon (IL)

(73) Assignee: Tel Aviv University Future Technology Development L.P., Tel Aviv (IL)

( * ) Notice: Subject to any disclaimer, the term of this patent is extended or adjusted under 35 U.S.C. 154(b) by 0 days.

(21) Appl. No.: 09/622,676

(22) PCT Filed: Feb. 22, 1999

(86) PCT No.: PCT/IL99/00109

§ 371 (c)(1),
(2), (4) Date: Oct. 18, 2000

(87) PCT Pub. No.: WO99/44245

PCT Pub. Date: Sep. 2, 1999

(30) Foreign Application Priority Data

Feb. 24, 1998 (IL) ................................................. 123419
Oct. 30, 1998 (IL) ................................................. 126830

(51) Int. Cl.[7] .......................... H01M 8/10; A61K 9/14
(52) U.S. Cl. .......................... 429/30; 429/33; 429/304; 429/309; 429/324; 429/330; 424/486; 424/487
(58) Field of Search ................................ 424/486, 487; 429/30, 33, 41, 46, 188, 303, 304, 306, 309, 324, 326, 330, 331, 129, 325; 427/115

(56) References Cited

U.S. PATENT DOCUMENTS

| | | | |
|---|---|---|---|
| 4,623,415 A | 11/1986 | Kahara et al. .............. 156/325 |
| 4,652,356 A | 3/1987 | Oda et al. |
| 4,687,715 A | 8/1987 | Michael ........................ 429/41 |
| 4,780,954 A | 11/1988 | Kato ........................... 29/623.5 |
| 4,895,775 A | 1/1990 | Kato et al. .................... 429/41 |
| 5,039,382 A | 8/1991 | Suzuki et al. |
| 5,425,865 A | 6/1995 | Singleton et al. ........... 204/252 |
| 5,456,600 A | 10/1995 | Andreiko et al. ............. 433/24 |
| 5,523,181 A | 6/1996 | Stonehart et al. |
| 5,643,689 A | 7/1997 | Fleischer et al. ............. 429/33 |
| 5,709,786 A | 1/1998 | Friese ......................... 204/421 |
| 5,834,136 A * | 11/1998 | Gao et al. ................... 429/309 |
| 6,025,092 A | 2/2000 | Doyle et al. |
| 6,124,059 A * | 9/2000 | Bohnstedt et al. .......... 429/252 |
| 6,447,909 B1 * | 9/2002 | Kato et al. .................. 428/403 |

FOREIGN PATENT DOCUMENTS

GB    1581194    12/1980

* cited by examiner

Primary Examiner—Bruce F. Bell
Assistant Examiner—Monique Wills
(74) Attorney, Agent, or Firm—Gary M. Nath; Todd L. Juneau; Lee C. Heiman

(57) ABSTRACT

The present invention provides an ion conducting matrix comprising: (i) 5 to 60% by volume of an inorganic powder having a good aqueous electrolyte absorption capacity; (ii) 5 to 50% by volume of a polymeric binder that is chemically compatible with an aqueous electrolyte; and (iii) 10 to 90% by volume of an aqueous electrolyte, wherein the inorganic powder comprises essentially sub-micron particles. The present invention further provides a membrane being a film made of the matrix of the invention and a composite electrode comprising 10 to 70% by volume of the matrix of the invention.

39 Claims, 2 Drawing Sheets

ION CONDUCTIVE MATRIXES AND THEIR USE

FIELD OF THE INVENTION

The present invention relates to ion conductive matrixes, membranes and electrodes, their manufacture and use. In particular, the present invention is concerned with membranes comprising composite polymeric films and composite polymers.

BACKGROUND OF THE INVENTION

Ion conducting membranes (to be referred to hereinafter as "ICM") are to be found in many electrochemical cells, among which: fuel cells, electrolyzers, electrochromic cells, batteries, electrochemical sensors and others. In some cases, polymer electrolyte is used such as Nafion. However, Nafion based fuel cells suffer from two major disadvantages. The first is that Nafion is a very expensive material and the second, its characteristic to dry out during the fuel cell operation due to water dragging by the protons conducted.

U.S. Pat. No. 5,456,600 teaches the use of a polymeric membrane for making an lithium-ion rechargable battery cell. The membrane disclosed is a combination of a poly (vinylidene fluoride) copolymer matrix and a compatible organic solvent plasticizer which maintains a homogenous composition in the form of a flexible, self-supporting film.

U.S. Pat. No. 5,643,689 discloses a non-liquid proton conductor membrane which comprises a matrix polymer dissolvable in a solvent and an acidic multimer dissolvable in that solvent. In accordance with the disclosure of this publication, when the membrane is contacted with a second solvent, it swells to allow an improved electrical contact between the cathode and anode plates in which the membrane is interposed.

Another type of polymer membrane is described in U.S. Pat. No. 5,425,865. The membranes described comprise a porous matrix of a crosslinked polymeric material, and a second polymeric material that partially blocks the pores of that matrix.

Another type of cell is the phosphoric acid fuel cell (PAFC), wherein acid is absorbed in a porous matrix made of e.g. silicon carbide powder and metal phosphate or metal oxide or metal salt. Typically, such a cell operates at elevated temperatures, about 180° to 200° C. U.S. Pat. No. 4,623,415 describes a membrane comprising a porous matrix for retaining phosphoric acid electrolyte where the matrix consists of a substance which is unreactive with phosphoric acid and has electron insulating properties.

SUMMARY OF THE INVENTION

It is an object of the present invention to provide a novel, low cost and highly conductive ion conducting matrix, i.e. a matrix in which ions derived from acids, bases or salts are mobile.

It is another object of the present invention to provide novel, low cost and highly conductive ion conducting membranes and electrodes.

Another object of the present invention is to provide electrochemical cells comprising the matrixes of the invention.

It is yet a further object of the invention to provide methods for preparing such membranes and electrodes.

Still, it is the object of the present invention to provide uses for the ion conducting membranes and electrodes invention.

Other objects of the invention will become apparent as the description of the invention proceeds.

Thus, the present invention provides by the first of its aspects an ion conducting matrix comprising:
(i) 5% to 60% by volume of an inorganic powder having a good aqueous electrolyte absorption capacity;
(ii) 5% to 50% by volume of a polymeric binder that is chemically compatible with an aqueous electrolyte; and
(iii) 10 to 90% by volume of an aqueous electrolyte,
wherein the inorganic powder comprises essentially sub-micron particles, preferably from about 5 to about 150 nm in size. The matrix of the present invention may optionally comprise between about 0.1% to about 25% of a non-volatile liquid lubricant that is chemically compatible with all the components in the matrix.

In accordance with a preferred embodiment of the present invention, the inorganic powder is characterized in that it has a surface area of at least 10 $m^2/g$, and possesses a good absorption capability for the aqueous electrolyte.

According to another aspect of the invention, there is a provided a membrane being a film made of the matrix of the invention.

According to a further aspect of the invention, there is provided a composite electrode comprising 10 to 70% by volume of the matrix of the invention and the balance is made essentially by an electrode material which is a material known in the art per se as a suitable material in the manufacturing of electrodes, eg. carbon, graphite, air, oxygen, $H_2$, methanol electrodes, Zn, Cd, Ni, Pb, Fe, Cu or their alloys, metal oxide electrodes, e.g. $RuO_2$, $WO_x$, $MnO_2$, NiOOH, AgO, $Ag_2O$ and the like.

In the case that the matrix of the invention is used as an ion conducting matrix in a composite electrode, the inorganic powder may be electronically conductive.

Preferably, the inorganic powder of the matrix of the present invention is a member selected from the group consisting of $SiO_2$, $ZrO_2$, $B_2O_3$, $TiO_2$, $Al_2O_3$ and the like.

The polymeric binder used in the matrix of the present invention is a material which is chemically compatible with an aqueous electrolyte used, i.e. non-soluble in that electrolyte, and is a member selected from the group consisiting of: polyvinilyden fluoride (PVDF), PVDF-hexafluoropropylene (PVDHFP), poly(tetrafluoroethylene) (PTFE), poly(methylmethacrylate) (PMMA), polysulfone amide, poly(acrylamide), polyvinyl chloride (PVC), poly (acrylonitrile), polyvinyl flouride and any combination thereof.

The aqueous electrolyte of the present invention consists of an aqueous soluble compound selected from a salt, a base or mixtures thereof. Examples of aqueous soluble salts are alkali metal salts, alkali earth metal salt, $R_4NX$ where R is hydrogen or an organic radical and X is an anion derived from an inorganic acid, $NH_4Cl$, $ZnCl_2$ and any combinations thereof.

Examples of aqueous soluble bases for use in the present invention are $R_4NOH$ where R is hydrogen or an organic radical alkali or alkali earth base compounds and any combinations thereof.

In the case that the matrix of the invention is used as a proton conducting matrix it is referred to hereinafter as "TCM". The acid according to the present invention, which may be also a mixture of acids, may be a pure acid or an acid dissolved in water or in another suitable non-aqueous solvent that is known per se in the art. Acids suitable according to the present invention are: $CF_3(CF_2)_nSO_3H$, $HO_3S(CF_2)_n SO_3H$ wherein n is an integer having a value of 0 to 9, sulfuric acid, HCl, HBr, phosphoric acid, $HNO_3$ and the like. Preferred acids are $CF_3(CF_2)_nSO_3H$ or $HO_3S_3S$ $(CF_2)_n SO_3H$ where n is equal to 0, 1, 2, 3 or 4. These preferred acids can be used either in their pure form or as aqueous solutions having a molar concentration of 10 to 99%, and preferably a molar concentration of 25% to 99%.

The ICM of the present invention has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the invention, where the matrix is in the preparation of a membrane, the inorganic powder comprised in the matrix is a very fine, electronically non-conductive powder having a particle size of preferably less than 150 nm. According to this embodiment, the ICM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is, the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the invention, an improvement of the matrix wettability and consequently the electrolyte retention, is achieved by adding to the membrane multi valance metal salts such as Al, Zr, B, Ti and the like.

According to another embodiment of the invention, the improvement of the matrix wettability and consequently the electrolyte retention is achieved by pre-treating the inorganic powder with an acid or a base prior to the preparation of the membrane.

The elasticity and elongation of ICMs that are rich in inorganic powder and that of electrodes based on these materials were improved by the addition of low to medium molecular weight (typically 100 to 7500 mass units) oil or oil like liquid materials that serve as an internal lubricant between the molecules of the polymer binder. The main effects of the intend lubricant are to increase the distance between the polymer chains, thus reducing the attraction forces between the polymer molecules and/or replacing the original attraction forces between the polymer molecules with lower attraction forces between the internal lubricant molecules and/or becoming a separation layer between the polymer molecules. ICMs that contain an internal lubricant have smaller resistance to external forces because the polymer chains can slide more easily one over the other. It is essential that these materials have low vapor pressure and are compatible with all other components at the relevant temperatures of application. In order to reduce the escape effects of an internal lubricant from the ICM (lower migration rates of these materials to the surface of the polymer) it is recommended, according to the present invention, to use an internal lubricant with a low vapor pressure, to use liquid polymeric internal lubricants or to chemically link the internal lubricant to the polymer molecules. Some of these lubricants may be useful only at room temperature and at mild conditions (e.g. not in strong acids or bases).

It was found, according to the present invention, that during the preparation process one of the following factors must be controlled:

a) The solubility parameter ($\delta$-factor) of the internal lubricant should not differ by more than 5 $(cal/cc)^{1/2}$ units from that of the polymer.

b) The solubility parameter ($\delta$-factor) of the mixture of an internal lubricant or lubricants (in case of a combination of lubricants) and the solvent or solvents (in case of a mixture of solvents) will not differ by more than 5 units from that of the polymer of the matrix.

(Solubility parameters are defined in: "Polymer Handbook", Interscience Publishers, a division of John Wiley & Sons, 1966, pp. IV-344–IV-367; J. E. Mark, Physical Properties of Polymers Handbook, American Institute of Physics, Woodbury, N.Y., 1996. pp. 231–237 and R. C. Weast CRC Hand Book of Chemistry and Physics, $56^{th}$ Edition, 1975–1976, published by CRC Press.)

There is an advantage in using internal lubricants that have a low solubility in water so as to achieve a solubility factor which is not higher than 14 $(cal/cc)^{1/2}$, preferably not higher than 10 $(cal/cc)^{1/2}$. The low solubility prevents the migration of internal lubricant out of the ICMs when they come in contact with water at the washing phase or at the acid loading phase.

The internal liquid lubricant materials are selected, for example, from the following materials: diesters of aliphatic and aromatic dibasic acids such as, for example, adipic acid, phthalic acid and sebacic acid, esters of phosphoric acid, hydrocarbons and synthetic hydrocarbons such as decan, dodecan, etc., machine oil, silicone oils, fluorocarbons such as perfluoropolyethers, for example: $CF_3O[-CF(CF_3)-CF_2O-]_x(CF_2O-)_yCF_3$, X being between 0 and 50 and y between 0 and 100. It was found that the addition of these lubricants increases in some cases the conductivity of the ICM by over 30%.

Still by another embodiment of the present invention, there is provided a membrane as described above that is mechanically reinforced. The reinforcement can be done by any way known per se in the art, e.g., including in the membrane an electronically non-conductive screen, felt, fibers or any other reinforcing element as known in the art.

The ion conducting membranes of the invention may be prepared by any one of several methods, which are also encompassed by the present invention, among which are casting and extrusion. The method for casting an ICM according to the present invention comprises the following steps:

(i) preparing a mixture comprising an inorganic powder, a polymeric binder that is chemically compatible with an aqueous electrolyte, at least one solvent characterized in having a high boiling point of above 100° C. and at least one low boiling point solvent, having a boiling point lower than that of the high boiling point solvent(s), in which the polymeric binder is soluble or form a gel at the casting temperature;

(ii) casting a film out of the mixture;

(iii) allowing the low boiling point solvent to evaporate from the mixture, thus forming a solid film;

(iv) washing the solid film and replacing the high boiling point solvent with the desired aqueous electrolyte solution to be included in the membrane.

According to a preferred embodiment of the invention, the mixture is prepared in a paste-like gel or gel form and is introduced into a mold to obtain the required film form. The evaporation of the low boiling solvent as described in step (iii) should not necessarily be completed prior to proceeding to step (iv), and it may suffice that a solid film which can be further processed, is obtained. The film is then washed, preferably first with water and then with the electrolyte to be absorbed in the matrix, forming the required membrane. This step is carried preferably at a temperature of less than 150° C. The use of water or the electrolyte may be done by repeating immersions of the film therein so as to displace the water or the high boiling solvent, as applicable. Preferably, the last immersion is conducted at an elevated temperature so as to evaporate the solvent and allow the aqueous electrolyte solution to replace it in the membrane formed. When using a water non-soluble high boiling point solvent the process involves washing the solid film with another solvent that is water soluble, followed by washing the solid film with water.

When casing a composite electrode which comprises the matrix of the present invention, the mixture prepared in step (i) of the above-described method, comprises a further powder of the suitable electrode material. The remaining steps of the process are carried mutatis mutandis as described in the method for casting an ICM.

According to a further embodiment of the invention, the high boiling point solvent is a water soluble solvent, and is preferably a member selected from the group consisting of propylene carbonate (PC), ethylene carbonate (EC), dimethyl phthalate, diethyl phthalate, dibutyl phthalate and the like of any combinations thereof.

According to another embodiment of the invention, the low boiling point solvent is a member selected from the group consisting of tetrahydrofuran (THF), DME, cyclopentanon, acetone, N-methyl pyrrolidon (NMP), dimethylacetamide (DMAC), methylethylketone (MEK), dimethylformamide and the like, or any combination thereof.

The method for extruding an ICM according to the invention comprises the following steps:

(i) preparing a mixture comprising an inorganic powder, a polymeric binder that is chemically compatible with an aqueous electrolyte and at least one solvent characterized in having a boiling point of above 90° C. in which the polymeric binder is at least partially soluble or form a gel at extrusion temperature;

(ii) heating the mixture to its softening temperature;

(iii) forming a film out of the mixture by hot extruding the softened mixture;

(iv) cooling the film thus formed;

(v) washing the solid film and replacing the solvent with the desired aqueous electrolyte solution to be included in the membrane.

When extruding a composite electrode which comprises the matrix of the present invention, the mixture prepared in step (i) of the above-described method comprises a further powder of the suitable electrode material. The remaining steps of the process are carried mutatis mutandis as described in the method of extruding an ICM.

According to a preferred embodiment of the invention, the solvent suitable for the extrusion method is a water soluble solvent being a member selected from the group consisting of propylene carbonate, diethyl carbonate, dimethyl carbonate butryoalactone, methyl isoamyl ketone, cyclohexanone, dialkyl phthalate, glycerol triacetate and the like or any combinations thereof.

The washing of the film described in step (v) is preferably done first with water and then with the aqueous electrolyte to be dissolved into the matrix, to form the required membrane. Water or the electrolyte is applied by repeatedly immersing the film therein so as to displace the water or the solvent, as applicable.

Another aspect of the invention concerns possible uses of the matrixes of the invention. One such use is the manufacture of electrochemical cells that are substantially free from mobile liquid electrolyte solution. Electrochemical cells may comprise an ICM sandwiched by two electrodes. Such electrodes are carbon or graphite, Zn, Fe, Cd, Ni, Cu, Al and their alloys; electrodes or metal oxide electrodes, e.g. of $RuO_2$, $WOX_x$, $MnO_2$, NiOOH, AgO, $Ag_2O$ and the like. This type of a cell may be manufactured by using a hot press technique. In this process, the two electrodes and the ICM therebetween are pressed together at the softening temperature of the binder, with or without a solvent, typically at a temperature in the range of from about 60° to 150° and under 20 to 1000 Kg/cm$^2$ for about 1 to 10 minutes, obtaining a single structural cell unit with improved mechanical strength and performance.

According to a preferred embodiment of the invention, a Zn cell may also be manufactured by hot pressing together a cathode, an anode and an ICM therebetween. In this process the anode consists of a ceramic powder binder such as PVDF and Zn in the form of a fine powder; the cathode may also consist of PVDF, ceramic powder, a metal oxide such as $MnO_2$ and a small amount of carbon or graphite. In case that a Zn air cell is assembled, the cathode is a commercial air electrode made of platinum or another catalyst supported on carbon or graphite particles, paper or felt.

Cells such as Zn/air or Zn/oxygen cells consisist of 1) a composite Zn electrode made typically of about 30% v/v the ICM matrix and 70% of Zn in the form of a fine powder. The preferred Zn powder consists of up to 0.1% (w/w) Hg, Sn, In, Bi, Pb or mixture thereof for corrosion prevention; 2) an ICM; 3) an oxygen or air electrode. The air or oxygen electrode consists of a catalyst selected from Pt, Pd, W, Mn, Cu, Ag, Ni or their mixture or their oxides supported by carbon or graphite powder. The amount of the catalyst is from about 5% to about 50% w/w relative to the carbon or graphite powder.

One side of the air or oxygen electrode is hydrophilic and the other side is hydrophobic. Commercially available air or oxygen electrodes can be used or they can be made with the ICM matrix where the hydrophobic side contains more than 25% v/v polymer, preferably Teflon and no ceramic powder.

For example, according to the present invention, nickel-cadmium and nickel-iron batteries consist of a cathode made of NiOOH powder and the ICM matrix, while the anode is made of either cadmium based powder and ICM matrix or iron based powder and the ICM matrix.

In all cases, the polymer binder must be chemically compatible with both the electrolyte and the electrode materials. For alkali solutions, binders such as Teflon (PTFE), polycarbonate, PVC, polypropylene and rubber are preferred.

Other uses according to the present invention include lead acid battery where one or both electrodes are composite electrodes which comprise the proton conducting matrix of the invention. Also, the present invention encompasses lead acid batteries comprising PCMs of the invention.

Figure 1:
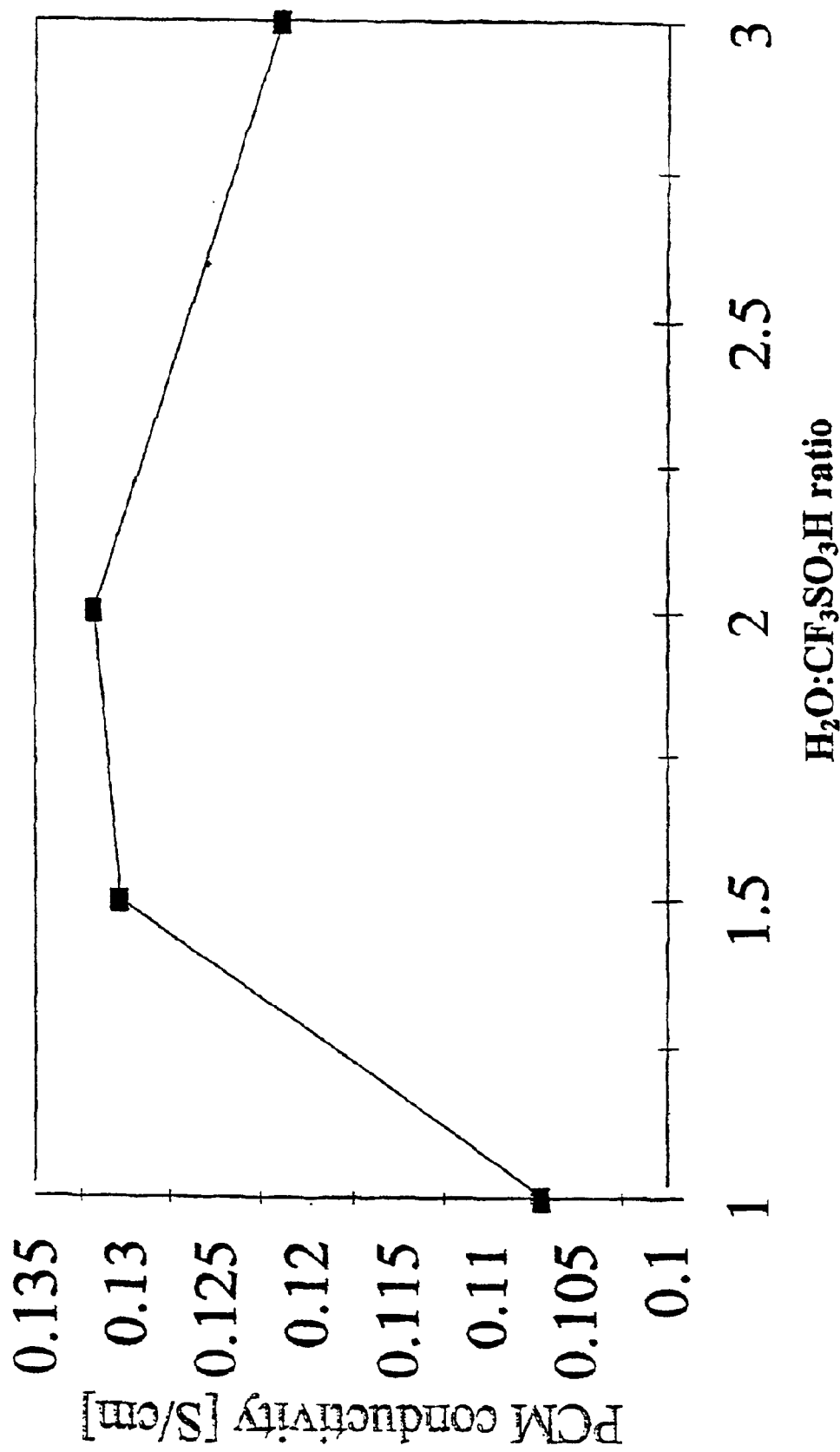
FIG. 1 presents results of conductivity measurements for PCMs prepared in accordance with the present invention.

The following examples are not to be construed as limiting the invention as described herein.

EXAMPLES

Example 1

A membrane film was manufactured by mixing 0.170 g of powdered Kynar PVDF 2801-00 and 0.147 gr of high surface area, amorphous fumes particle size 400 m$^2$/g silicon (IV) oxide, 99.8% Alfa Aesar by A. Johnson Matthey Company, with a 20 ml. of cyclopentanon and 0.48 ml of propylene carbonate (PC). The viscous mixture obtained, was poured onto a Teflon plate and was allowed to dry at room temperature for 24 hours. Thereafter, a flexible, strong, transparent film was obtained.

The film was washed by using double distilled water in order to remove the PC. Following the washing, the film became less transparent, but possessed higher mechanical strength. In the Tables presented in the proceeding Examples, the following terms are used to describe mechanical properties: Bad—denotes a membrane which can easily be torn by hand Good—denotes a membrane that is not easily torn by hand, Very Good denotes a membrane for which rupture extensive force is required.

In the same manner, other samples were made in different compositions as can be seen in Table 1.

TABLE 1

ICM composition and mechanical properties

| Sample No. | $SiO_2$ vol. % | PVDF vol. % | Porosity vol. % | ICM mechanical properties |
|---|---|---|---|---|
| 1 | 0.5 | 24.5 | 75% | Very Good |
| 2 | 0.5 | 24.5 | 75% | Very Good |
| 3 | 1.0 | 24.0 | 75% | Very Good |
| 4 | 2.8 | 37.2 | 60% | — |
| 5 | 2.5 | 22.5 | 75% | Very Good |
| 6 | 3.5 | 21.5 | 75% | Good |
| 7 | 5.0 | 37.2 | 75% | — |
| 8 | 9.6 | 22.4 | 68% | Bad |
| 9 | 10.0 | 15.0 | 75% | Very Good |
| 10 | 12.8 | 19.2 | 68% | Bad |
| 11 | 8.0 | 12.0 | 80% | Very Good |
| 12 | 12.5 | 12.5 | 75% | Bad |
| 13 | 5.0 | 5.0 | 90% | Bad |
| 14 | 15.0 | 10.0 | 75% | Bad |

Samples number 9 and 11 exhibited the best wetting and capillary properties. This sample after water wash could be bent 180% without causing any damage to the film. Moreover, an acid wet film was heated at 110° C. for several hours, and its structure remained intact and its capillary properties did not change. The pore size distribution of this ICM was measured using Quantachrome NOVA 2200 Surface Area Analyzer. It was found that a significant volume (above 15%) of the nanosize pores had a diameter smaller than 3 nm.

The thickness of the ICMs described in Table 1 were in the range of 0.05 to 1 mm.

Example 2

A membrane film was manufactured by mixing 0.850 gr of powdered Kynar PVDF 2801-00 with 1.363 gr of high surface area Titania, in 25 ml cyclopentanon with 2.4 ml of PC. The viscous mixture was poured on a Teflon plate as described in Example 1 and was allowed to dry at room temperature for 24 hours. Thereafter, a flexible, opaque white film with very good mechanical strength was obtained.

The film was washed with double distilled water, similarly to the treatment in Example 1. In the same manner, other samples were prepared while different compositions were used. The results obtained are given in Table 2.

TABLE 2

ICM composition and mechanical properties

| Sample No. | $TiO_2$ vol. % | PVDF vol. % | Porosity vol. % | ICM mechanical properties |
|---|---|---|---|---|
| 1 | 2.5 | 22.5 | 75% | Very Good |
| 2 | 7.5 | 17.5 | 75% | Very Good |
| 3 | 10.0 | 15.0 | 75% | Very Good |

Example 3

A membrane film was manufactured by mixing 0.85 gr of Kynar PVDF 2801-00 with 1.270 gr of micropolish 0.05 micron gamma Alumina manufactured by Buehler, in 20 ml of acetone with 2.4 ml of PC. The viscous mixture was poured on a Teflon plate as described in the preceding examples. A flexible, opaque white film having very good mechanical strength was thus obtained.

Example 4

A film prepared according to the description given for sample No. 9 of Example 1 was immersed in several aqueous solutions of trifluoromethane sulfuric acid (TFMSA) in acid to water v/v ratios of 1:1, 1:15, 1:2 and 1:3 for 3 hours under room conditions. The conductivity of the PCMs thus obtained was measured by using AC impedance spectroscopy Solartron model SE 1260. The measurements were made while using two 1 $cm^2$ stainless steel electrodes. The results presented in FIG. 1 indicate that the conductivity was practically the same for all PCMs where acid to water v/v ratio was in the range of 1:1 to 1:3, with a slightly higher conductivity, of 0.132 S/cm at 25° C., for the PCM comprising the 1:2 acid to water v/v content.

Example 5

A film of sample No. 9 (Table 1) was immersed in ether and a 0.1M or 1M KOH for periods of 1 min. or 1 hr., and then immersed in different volume concentration solutions of TFMSA as described in Example 4 to form PCM. The PCMs conductivity was measured as described in Example 4. The results obtained indicated that the wetting properties of the base treated PCMs were improved while its conductivity was not significantly changed.

Example 6

A PCM was formed by immersing the film of sample No. 9 (Table 1) in a 1:2 TFMSA to water solution (v/v) for 2.5 hours at 90° C. The conductivity of the PCM was measured as described in Example 4, and an increase of about 20% was found in its conductivity at room temperature over a PCM which was acid treated at such temperature.

Example 7

A PCM film was formed by immersing films of samples No. 11 and 13 (Table 1) in a 1:2 acid to water solution (v/v) for 3.5 hrs. at room temperature. The conductivity was measured as was described in Example 4. The conductivity found was 0.108 and 0.126 S/cm for samples No. 11 and 13, respectively.

Example 8

A PCM was formed by immersing ms of samples No. 11 and 13 (Table 1) in aqueous solution of $H_2SO_4:H_2O$ 1:3 v/v or in concentrated $H_2SO_4$ for 3.5 hrs. at room temperature The conductivity of the PCM thus obtained was measured as was described in Example 4. The results measured for sample No. 11 were about 0.038. and about 0.179 S/cm for concentrated $H_2SO_4$ and 1:3 $H_2SO_4:H_2O$, respectively, whereas the results measured for sample No. 13 were about 0.058 and about 0.207 S/cm for concentrated $H_2SO_4$ and 1:3 $H_2SO_4:H_2O$ respectively.

Example 9

A film of sample No. 9 (Table 1) was immersed in aqueous solution of $CF_3SO_3H:H_2O$ 1:3 (v/v) for 2.5 hrs. The PCM thus obtained was hot is pressed with a carbon electrode which comprised 40% (v:v) of the combination. The heating of the two films was carried out between two polished stainless steel pellets sprayed with decan, in order to prevent sticking to the stainless steel pellets. The process was conducted at 130° C. and under 7 atm, for the period of 15 sec. The PCM and carbon electrode adhered to each other in a good form.

Example 10

Figure 2:
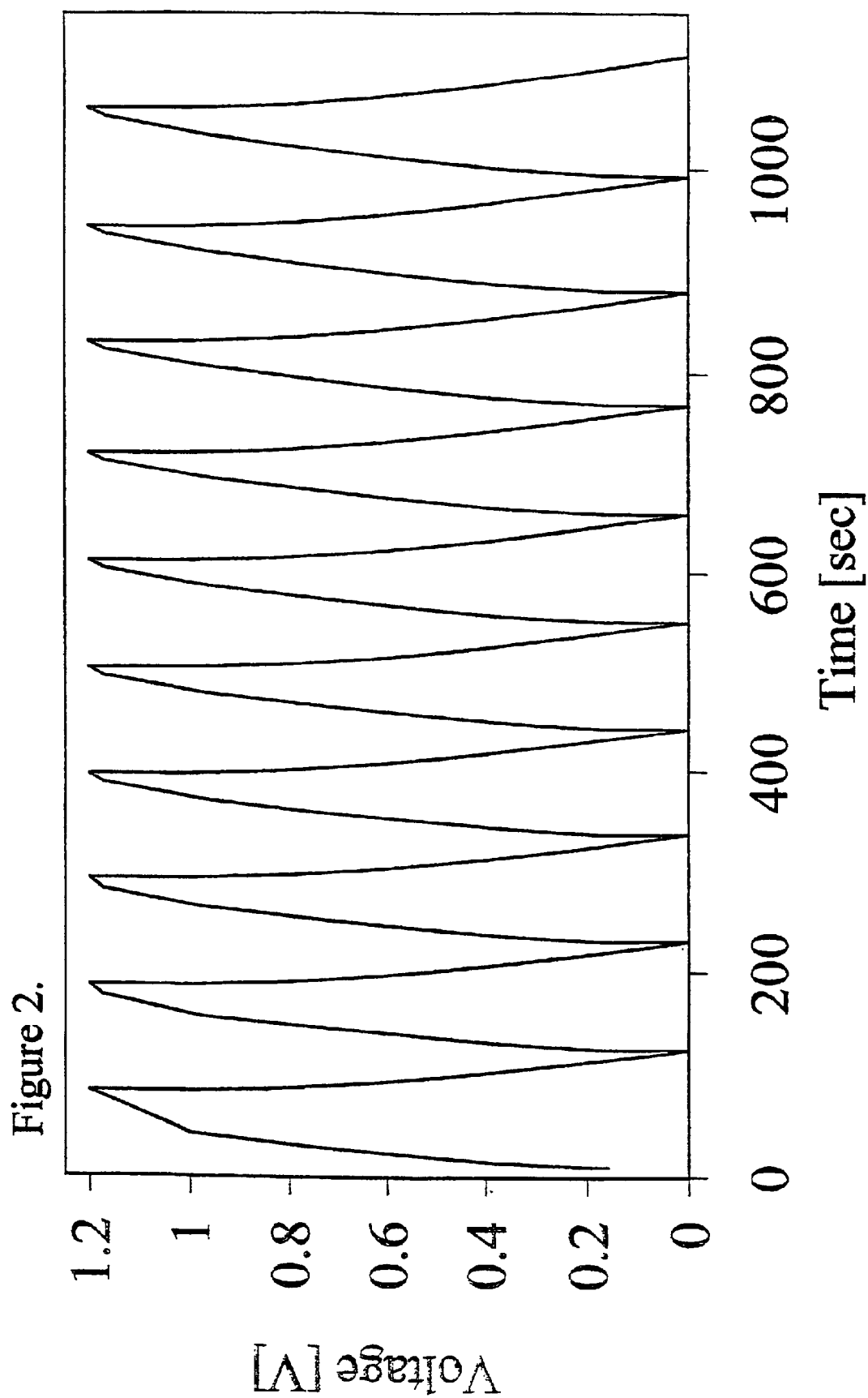
FIG. 2 illustrates the charge-discharge cycles of a capacitor disclosed in Example 10.

A double layer capacitor having two Ti foils as current collectors, was assembled. Two 4.91 cm² composite carbon electrodes were mounted on both sides of a PCM prepared in accordance with the disclosure of Example 6. Each carbon electrode was comprised of two layers: the first layer was a 0.3 mm thick porous layer, made of 15% $SiO_2$, 5% oxidized Shawinigm Blac, 50% oxidized Graphite, 10% Teflon and 10% Graphite fibers, pressed under 100 kg/cm². The second layer was a 1 mm impermeable layer made of 65% Graphite, 15% Teflon and 20% Graphite fibers, pressed under 1000 kg/cm². Before assembling the cell, the carbon electrodes were sprayed with the 1:2 TFMSA: water solution. The capacitor was charged and discharged under a current of 20 mA, using Maccor 2000 Tester with voltage of 0.01 to 1.2V. The graph illustrating the charge and discharge is presented in FIG. 2.

Example 11

A membrane film was manufactured by mixing 0.85 gr of Kynar PVDF 2801-00 with 0.682 gr of Degussa Titandioxid P25, 0.368 gr of is Johnson Matthey Silicon (IV) Oxide, 15 ml cyclopentanon and 2.4 ml of PC. The viscous mixture was poured on a Teflon plate as described in the preceding examples. A flexible, opaque white film having very good mechanical strength was thus obtained.

Example 12

Samples prepared as described in Examples 2,3 and 11, were immersed in aqueous solution of 1:2 of $TFMSA:H_2O$ (v/v) for 1 to 1.5 hours at approximately 100° C. The conductivity of the PCMs was measured as described in the preceding examples. The results were the following: the PCM conductivity of sample 2 (Table 2) was 0.032 S/cm; the conductivity of Example 3 PCM—0.020 S/cm, and the conductivity of Example 11 PCM—0.04 S/cm.

Example 13

The pore size distribution of the PCM described in sample 9 of Table 1 was measured by using Quantachrome NOVA 2200 Surface Area analyzer. It was found that a significant volume of the material tested had nanosize pores having a characteristic dimension of less that 8 nm. These nanosize pores have good retention capabiliy for the acid and are small enough to prevent gas bubbles to cross over the PCM. This property is of importance in the case where the PCM of the invention is used for fuel cell applications.

Example 14

A film prepared according to the description given for sample No. 9 in Example 1 was immersed in several aqueous solutions of KOH. The results are summarized in Table 3.

TABLE 3

Characterization of KOH Based ICM

| ICM | KOH Concentration [M] | Resistance [Ω] | Thickness [μm] | σ [S/cm] |
|---|---|---|---|---|
| 1 | 1 | 0.0869 | 65 | 0.0747 |
| 2 | 1 | 0.0808 | 65 | 0.0804 |
| 3 | 1 | 0.0862 | 65 | 0.0754 |
| 3 | 1 | 0.2140 | 175 | 0.0817 |
| 4 | 2 | 0.0473 | 65 | 0.1374 |
| 5 | 2 | 0.0467 | 75 | 0.1605 |
| 6 | 2 | 0.0486 | 70 | 0.1440 |
| 7 | 2 | 0.1372 | 155 | 0.1129 |

Example 15

A double layer capacitor having two Ti foils as current collectors, was assembled. Two 4.91 cm² composite carbon electrodes, were mounted on both sides of an ICM prepared in accordance with the disclosure of Example 5. Each carbon electrode was comprised of two layers: the first layer was a 0.3 mm thick porous layer, made of 15% $SiO_2$, 5% oxidized Shawinigm Blac, 50% oxidized Graphite, 10% Teflon and 10% Graphite fibers, pressed under 100 kg/cm². The second layer was a 1 mm impermeable layer made of 65% Graphite, 15% Teflon and 20% Graphite fibers, pressed under 1000 kg/cm². Before assembling the cell, the carbon electrodes were sprayed with the 1M KOH solution. The capacitor was charged and discharged under a current of 10 mA, using Maccor 2000 Tester with voltage of 0.01 to 1.0V, and had a capacitance of 0.1F.

Example 16

An ion conducting membrane (ICM was made by immersing the film of sample No. 9 (Table 1) in a 2M $NH_4Cl$ aqueous solution. The conductivity was measured at room temperature by using AC impedance spectroscopy Solartron model SF 1260. The measurements were made while using two 1 cm² stainless steel electrodes. The conductivity was 0.04 S/cm.

Example 17

A cell having two Ti foils as current collectors was assembled. The 100 microns thick anode was 60% porous and the solid matrix consisted of 35% (v:v) PVDF and 65% fine Zn powder which contains 0.1% Hg. The 100 microns thick cathode was 60% porous and its solid matrix consisted of 35% (v:v) PVDF, 5% fine powder graphite and 60% fine powder $MnO_2$. A 100 microns thick ICM prepared in Example 16 was hot pressed between 1 cm² cathode and 1 cm² anode. The whole cell was immersed in 2M $NH_4Cl$ aqueous solution in order to fill all the pores. The excess of electrolyte was cleaned and the cell was held between the two Ti current collectors. The cell was discharged at 0.1 mA for 15 hours to 0.7V end voltage.

Example 18

A Zn air cell was assembled according to Example 17, except the electrolyte was 1M KOH. The cathode used was a commercial air electrode purchased from Electrochem. The cell was discharged at 0.1 mA for 25 hours and at an average voltage of 1.2V.

Example 19

A membrane film was manufactured by mixing 153 g. of powdered Kynar PVDF 2801-00 and 1.84 gr of high surface area, 16 nm particle size silicon dioxide, >99.8% (Degussa), 0.3 ml of Silicon oil (Wacker Chemie 500 AP), with a 43 ml. of cyclopentanon and 8 ml. of propylene cabonate (PC). The viscous mixture obtained, was poured onto K control coater (R K Print, Coat Instruments) and a film was made by using the doctor blade method. The film was allowed to dry at room temperature for a couple of hours. An elastic strong transparent film was obtained.

The film was washed with double distilled water in order to remove the PC, and it was immersed in 30% wt $H_2SO_4$ for 1.5 hours at 100° C. The conductivity of the PCM thus obtained was measured by using AC impedance spectroscopy Solartron model SF 1260. The measurements were conducted while using two 1 cm² Ti electrodes.

Example 20

In the same manner, other PCM samples were prepared with different compositions. Their qualitative elongation and conductivity have been determined (Table 4).

TABLE 4

PCM Composition, Conductivity and Elongation

| Sample No. | PVDF Vol. % | Internal lubricant | Vol. % of internal lubricant | Conductivity [S/cm] | Elongation |
|---|---|---|---|---|---|
| 1 | 9 | Decane | 3 | 0.44 | Good |
| 2 | 9 | Yivac 06/6 | 3 | 0.34 | Good |
| 3 | 10 | Paraffin | 2 | 0.38 | Good |
| 4 | 6 | Silicon Oil | 6 | 0.38 | Bad |
| 5 | 6 | Synthetic oil | 6 | 0.44 | Medium |
| 6 | 6 | Decane | 6 | 0.47 | Medium |
| 7 | 6 | Yivac 06/6 | 6 | 0.37 | Medium |

All PCMs contain 8% v/v silica, and they are about 80% porous. Yivac 06/6 is a perfluoropolyether of the general formula $CF_3O[-CF(CF_3)CF_2O-1]_x(-CF_2O-)_yCF_3$, M. W. 1800, purchased from Edwards.

The thickness of the PCM's described in Table 4 was in the range of to 0.08 to 0.1 mm.

What is claimed is:

1. An ion conducting matrix comprising:
   (i) 5% to 60% by volume of an inorganic powder having a surface area of at least 10 m²/g;
   (ii) 5% to 50% by volume of a polymeric binder that is chemically compatible with an aqueous electrolyte; and
   (iii) 10 to 90% by volume of an aqueous electrolyte, wherein the inorganic powder comprises particles that are essentially of a size of less than 150 nm, said matrix comprising pores with a typical size which is essentially smaller than 50 nm.

2. A matrix according to claim 1 that is a proton conducting matrix, comprising
   (i) 5% to 50% of an inorganic powder having a surface area of at least 10 m²/g;
   (ii) 5% to 50% by volume of acid chemically compatible polymeric binder; and
   (iii) 10 to 90% by volume of an acid, wherein the inorganic powder comprises particles that are essentially of a size of less than 150 nm, said matrix comprising pores with a typical size which is essentially smaller than 50 nm.

3. A matrix according to claim 1, optionally comprising between about 0.1% to about 25% by volume of a non-volatile liquid lubricant material that is chemically compatible with all the components in the matrix.

4. A matrix according to claim 3, wherein said lubricant is a member selected from the group consisting of diesters of aliphatic and aromatic dibasic acids, esters of phosphoric acid, hydrocarbons and synthetic hydrocarbons, silicone oils, fluorocarbons and mixtures thereof.

5. A matrix according to claim 1, wherein said inorganic powder is a member selected from the group consisting of $SiO_2$, $ZrO_2$, $B_2O_3$, $TiO_2$, $Al_2O_3$ and optionally hydroxides and oxy-hydroxy of Ti, Al, B and Zr, and any combination thereof.

6. A matrix according to claim 1, wherein said polymeric binder is a material which is a member selected from the group consisting of: polyvinilydene fluoride, polyvinilydene fluoridehexafluoro-propylene, poly(tetrafluoroethylene), poly(methylmethacrylate), polysulfone amide, poly (acrylamide), polyvinyl chloride, poly(acrylonitrile), polyvinyl fluoride and any combination thereof.

7. A matrix according to claim 1, wherein said aqueous electrolyte consists of an aqueous soluble compound selected from a salt, a base or mixtures thereof.

8. A matrix according to claim 7, wherein said aqueous soluble salt is a member selected from the group consisting of alkali metal salts, alkali earth metal salts, $R_4NX$, where R is an organic radical and X is an anion derived from an inorganic acid, $NH_4Cl$, $ZnCl_2$ and any combinations thereof.

9. A matrix according to claim 7, wherein said aqueous soluble base is a member selected from the group consisting of $R_4NOH$ where R is hydrogen or an organic radical, alkali or alkali earth base compounds and any combinations thereof.

10. A matrix according to claim 1, wherein said aqueous electrolyte is used in an aqueous solution having a molar concentration of from about 0.1M to about 10M.

11. A matrix according to claim 10, wherein the aqueous electrolyte has a molar concentration of from about 1M to about 5M.

12. A matrix according to claim 2, wherein said acid is a member selected from the group consisting of $CF_3(CF_2)_nSO_3H$, $HO_3S(CF_2)_nSO_3H$ where n is an integer having a value of 0 to 9, sulfuric acid, HCl, HBr, phosphoric acid and $HNO_3$, and any mixtures thereof.

13. A matrix according to claim 12, wherein said acid is selected from $CF_3(CF_2)_nSO_3H$ or $HO_3S(CF_2)_nSO_3H$, wherein n is equal to 0, 1, 2, 3 or 4.

14. A matrix according to claim 13, wherein said acid is used in an aqueous solution having a molar concentration of 10 to 99%.

15. A matrix according to claim 14, wherein said acid is used in an aqueous solution having a molar concentration of 25 to 99%.

16. A membrane comprising the ion conducting matrix of claim 1, wherein said inorganic material is electronically non-conductive material.

17. A membrane according to claim 16, wherein said membrane comprises pores with a typical pore size which is essentially smaller than 8 nm.

18. A membrane according to claim 16, wherein the inorganic powder of the matrix is treated with an acid or a base prior to the preparation of the membrane.

19. A membrane according to claim 16 which further comprises an electronic non-conductive reinforcing element.

20. A composite electrode comprising 10 to 70% by volume of the matrix of claim 1 and the balance is an electrode material.

21. A method for casting a membrane of claim 16 which comprises the following steps:

(i) preparing a mixture comprising an inorganic powder, a polymeric binder that is chemically compatible with an aqueous electrolyte, at least one solvent characterized in having a high boiling point of above 100° C. and at least one low boiling point solvent, having a boiling point lower than that of the high boiling point solvent (s), in which the polymeric binder is soluble or form a gel at the casting temperature;

(ii) casting a film out of the mixture;

(iii) allowing the low boiling point solvent to evaporate from the mixture, thus forming a solid film;

(iv) washing the solid film and replacing the high boiling point solvent with the aqueous electrolyte solution to be included in the membrane.

22. A method for casting a composite electrode of claim 20 which comprises the following steps:

(i) preparing a mixture comprising an inorganic powder, a polymeric binder that is chemically compatible with an aqueous electrolyte, at least one solvent characterized in having a high boiling point of above 100° C., at least one low boiling point solvent, having a boiling point lower than that of the high boiling point solvent (s) in which the polymeric binder is soluble or form a gel at the casting temperature, and a further powder comprising electrode material;

(ii) casting a film out of the mixture;

(iii) allowing the low boiling point solvent to evaporate from the mixture, thus forming a solid film;

(iv) washing the solid film and replacing the high boiling point solvent with the aqueous electrolyte solution to be included in the membrane.

23. A method according to claim 21, wherein the high boiling solvent is a water soluble solvent.

24. A method according to claim 21, wherein the high boiling point solvent is selected from the group consisting of propylene carbonate, ethylene carbonate, dimethyl phthalate, diethyl phthalate, dibutyl phthalate and the like or any combinations thereof.

25. A method according to claim 21, wherein the low boiling point solvent is a member selected from the group consisting of tetrahydrofuran, DME, cyclopentanon, acetone, N-methyl pyrrolidon, dimethylacetamide, methylethylketone, dimethyl-formamide, or any combination thereof.

26. A method for preparing a membrane of claim 16 by extrusion which comprises the following steps:

(i) preparing a mixture comprising an inorganic powder, a polymeric binder that is chemically compatible with an aqueous electrolyte and at least one solvent characterized in having a boiling point of above 90° C. in which the polymeric binder is at least partially soluble or form a gel at extrusion temperature;

(ii) heating the mixture to its softening temperature;

(iii) forming a film out of the mixture by hot extruding the softened mixture;

(iv) cooling the film thus formed;

(v) washing the solid film and replacing the solvent with the aqueous electrolyte solution to be included in the membrane.

27. A method for preparing a composite electrode of claim 20 by extrusion which comprises the following steps:

(i) preparing a mixture comprising an inorganic powder, a polymeric binder that is chemically compatible with an aqueous electrolyte, at least one solvent characterized in having a boiling point of above 90° C. in which the polymeric binder is at least partially soluble or form gel at extrusion temperature and a further powder comprising electrode material;

(ii) heating the mixture to its softening temperature;

(iii) forming a film out of the mixture by hot extruding the softened mixture;

(iv) cooling the film thus formed;

(v) washing the solid film and replacing the solvent with the aqueous electrolyte solution to be included in the membrane.

28. A method according to claim 26, wherein said solvent is a water soluble solvent.

29. A method according to claim 26, wherein said solvent is a member selected from the group consisting of propylene carbonate, diethyl carbonate, dimethyl carbonate, butyrolactone, methyl isoamyl ketone, cyclohexanone, dialkyl phthalate, glycerol triacetate or any combinations thereof.

30. An electrochemical cell comprising a membrane of claim 16.

31. An electrochemical cell comprising at least one electrode of claim 20.

32. An electrochemical cell according to claim 30, wherein said electrode material is a member selected from the group consisting of carbon, graphite and a combination thereof.

33. An electrochemical cell according to claim 30, wherein the anode active material is selected from Cd, Zn, Al or their alloys and the cathode active material is selected from $MnO_2$, silver oxides and NiOOH.

34. An electrochemical cell comprising a membrane as defined in claim 16, a Zn or Al anode and oxygen or air electrode which consists of a double layer film, wherein the air side is hydrophobic and the side close to the ionic membrane is hydrophilic.

35. An electrochemical cell according to claim 34, wherein the air electrode catalysts are compatible with the aqueous solution of the ionic conductive membrane and are selected from Pt, Pd, Au, Ag, Cu, Mn, W the oxides thereof or metal-porphyrin complexes of these salts.

36. An electrochemical cell according to claim 30, wherein said electrode material is a metal oxide selected from among $RuO_2$, WOx, and MnO2.

37. An electrochemical cell according to claim 30, wherein said cell is a single structure unit manufactured by hot pressing the electrodes on both sides of a membrane of claim 16.

38. A fuel cell comprising an ion conducting membrane of claim 16.

39. A water electrolizer comprising an ion conducting membrane of claim 16.

* * * * *